(12) United States Patent
Yasutomi et al.

(10) Patent No.: US 6,989,944 B2
(45) Date of Patent: Jan. 24, 2006

(54) CAMERA

(75) Inventors: Satoru Yasutomi, Hachioji (JP); Tetsuya Takagi, Akiruno (JP); Keita Takahashi, Tsukui-gun (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/820,368

(22) Filed: Apr. 7, 2004

(65) Prior Publication Data

US 2004/0228006 A1 Nov. 18, 2004

Related U.S. Application Data (63) Continuation-in-part of application No. 10/373,944, filed on Feb. 25, 2003, now Pat. No. 6,813,093, and a continuation-in-part of application No. 10/243,777, filed on Sep. 13, 2002, now Pat. No. 6,747,809.

(30) Foreign Application Priority Data

| Sep. 18, 2001 | (JP) | ............................. 2001-283664 |
| Feb. 27, 2002 | (JP) | ............................. 2002-051812 |
| Feb. 27, 2002 | (JP) | ............................. 2002-051813 |

(51) Int. Cl.
*G02B 15/14* (2006.01)

(52) U.S. Cl. ...................................... 359/699; 359/700

(58) Field of Classification Search ........ 359/699–701, 359/823, 694, 703; 396/72, 76, 79, 85, 121, 396/396
See application file for complete search history.

(56) References Cited

U.S. PATENT DOCUMENTS

| 5,488,513 | A | 1/1996 | Tanaka ........................ 359/699 |
| 5,912,772 | A | 6/1999 | Aoki ........................... 359/701 |
| 6,236,523 | B1 | 5/2001 | Iikawa et al. ................ 359/826 |
| 6,487,025 | B2 | 11/2002 | Koiwai et al. .............. 359/699 |
| 6,493,510 | B2 | 12/2002 | Shimizu ....................... 396/62 |
| 6,549,341 | B2 | 4/2003 | Nomura et al. ............. 359/699 |
| 6,570,718 | B2 | 5/2003 | Nomura et al. ............. 359/699 |
| 6,747,809 | B2 * | 6/2004 | Yasutomi ..................... 359/699 |
| 6,813,093 | B2 * | 11/2004 | Takagi et al. ................ 359/700 |
| 2003/0035224 | A1 | 2/2003 | Nishimura et al. ......... 359/699 |
| 2003/0072090 | A1 | 4/2003 | Yasutomi .................... 359/701 |
| 2003/0180036 | A1 | 9/2003 | Horiuchi et al. .............. 396/72 |
| 2003/0234986 | A1 | 12/2003 | Takagi et al. ............... 359/700 |

FOREIGN PATENT DOCUMENTS

| JP | 06-067076 A | 3/1994 |
| JP | 09-152542 A | 6/1997 |
| JP | 10-293239 A | 11/1998 |

* cited by examiner

*Primary Examiner*—Georgia Epps
*Assistant Examiner*—M. Hasan
(74) *Attorney, Agent, or Firm*—Frishauf, Holtz, Goodman & Chick, P.C.

(57) ABSTRACT

A camera with a lens barrel is provided which includes a first frame member having on an inner surface thereof a female helicoid, and a cam groove which has substantially a same lead angle as a lead angle of the female helicoid and which is deeper than the female helicoid. A second frame member is placed inside the first frame member. The second frame member includes a male helicoid engaged with the female helicoid, and a cam follower engaged with the cam groove. The first frame member is rotatable relative to the second frame member, so as to cause forward or backward movement of the second frame member.

44 Claims, 7 Drawing Sheets

CAMERA

This application is a Continuation-in-Part of: (i) U.S. application Ser. No. 10/243,777 filed Sep. 13, 2002 now U.S. Pat. No. 6,747,809 which claims the benefit of Japanese Application No. 2001-283664 filed in Japan on Sep. 18, 2001, and (ii) U.S. application Ser. No. 10/373,944 filed Feb. 25, 2003 now U.S. Pat. No. 6,813,093 which claims the benefit of Japanese Applications No. 2002-51812 filed in Japan on Feb. 27, 2002, and No. 2002-51813 filed in Japan on Feb. 27, 2002, the entire contents of all of which are incorporated herein by reference.

BACKGROUND OF THE INVENTION

1. Field of the Invention

The present invention relates to a camera with a lens barrel or the like constructed in such a manner that a plurality of lens frames each holding a photographic lens group are individually movable along an optical axis.

2. Related Art Statement

In recent years, in widespread compact zoom cameras, a zoom lens barrel has to advance or retract so as to cover a photographic range from a wide angle position to a telephoto position. The following zoom lens barrel is put into practical use. In order to further reduce a size of the zoom lens barrel while being carried, the zoom lens barrel is movable from a photographic position such as the wide angle position or the telephoto position to a collapsing position in which the zoom lens barrel is received in a camera body. Furthermore, in recent years, higher zoom magnification has been desired. Accordingly, a difference between the length of the lens barrel at the wide angle position or the collapsing position and the length of the lens barrel at the telephoto position is becoming larger. For the purpose of coping with this situation, serving as the structure of a lens frame assembly which can extend longer, a zoom lens barrel having many lens frames, namely, having a multistage lens frame structure, is needed.

In this kind of zoom lens barrel, generally, a plurality of lens frames holing photographic lens groups are individually movable along an optical axis. Serving as the zoom lens barrel having such a multistage lens frame structure, for example, there is a four-stage zoom lens barrel constructed by combining two single annular frames with two double frames each having a double structure including a frame member having cams or a helicoid and a linearly-movable frame having a straight guide. The zoom lens barrel comprises a first-stage stationary frame fixed to and supported by a camera body, a second-stage rotary frame and a movable frame in the rotary frame, a third-stage cam frame and a float key in the cam frame, and a fourth-stage first lens frame. The zoom lens barrel further comprises a second lens frame and a third lens frame which are received in the cam frame, and an advancing gear.

The first lens frame, the second lens frame, and the third lens frame hold a first lens group, a second lens group, and a third lens group along a lens optical axis of the present lens barrel, respectively. Each lens group comprises a plurality of photographic lens groups.

In the zoom lens barrel having the above configuration, a rotating force is transmitted from the advancing gear to the rotary frame, which is rotatably supported in the stationary frame. Thus, the movable frame is moved forward relative to the rotary frame. Then, the cam frame, which is engaged with through-cams of the movable frame and straight grooves of the rotary frame, is also advanced in association with the above forward movement. Consequently, the first lens frame engaged with a helicoid in the cam frame, the second lens group engaged with at least one cam groove in the cam frame, and the third lens group engaged with the first lens frame are advanced together with the float key in the cam frame. In this instance, in some cases, the first lens frame and the third lens frame are moved together during the zooming operation in order to simplify the mechanism and ensure precision.

Figure 6:
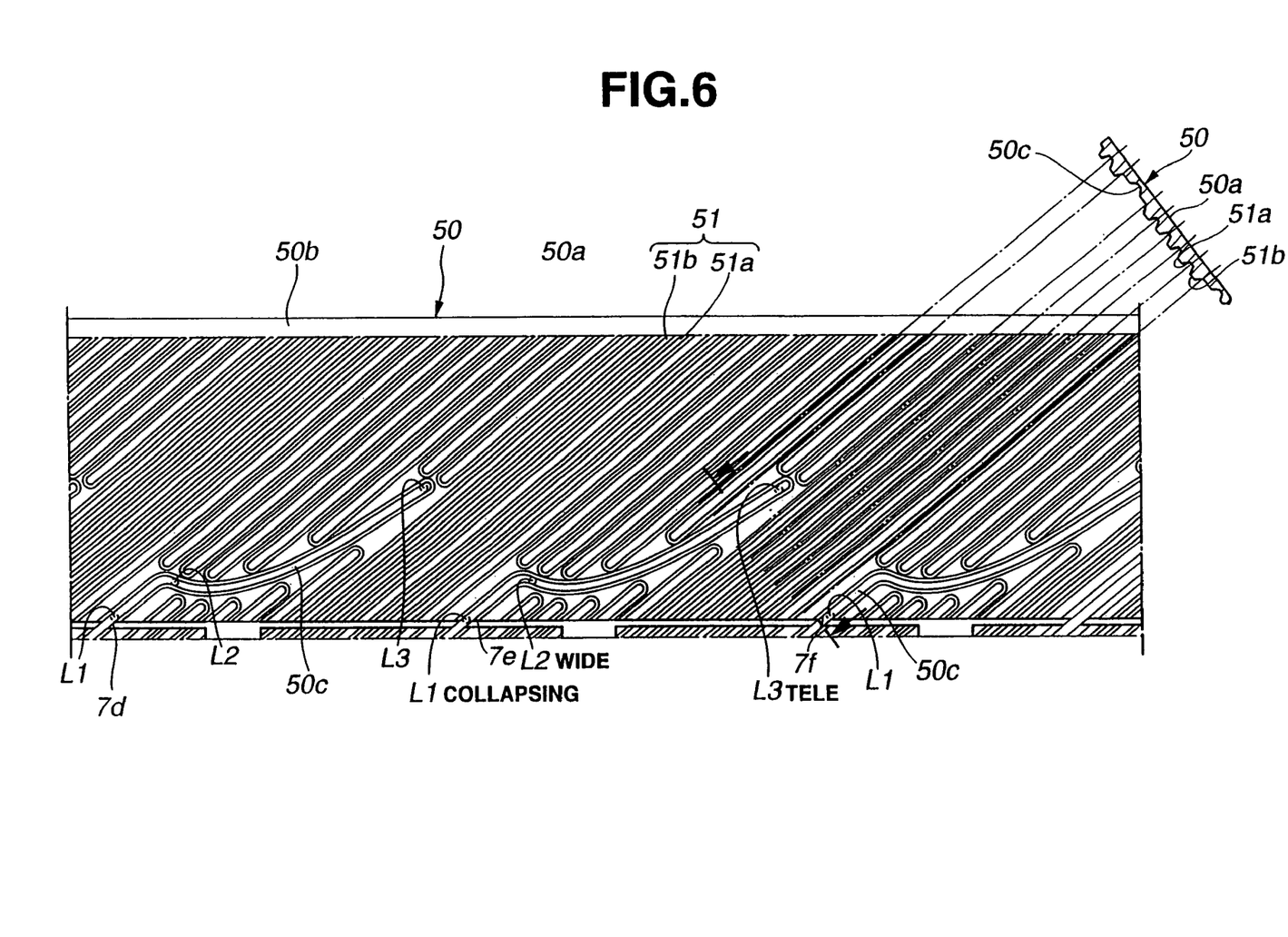
FIG. 6 is a development view of a cam frame mounted on a conventional zoom lens barrel.

In this type of zoom lens barrel, in some cases, in order to accomplish smooth relative movement of the first lens frame and the second lens frame with respect to the cam frame in the direction of the optical axis, helicoid engagement or engagement through cams is used between the frame members. FIG. 6 shows a conventional zoom lens barrel of this type.

FIG. 6 shows a cam frame mounted on the conventional zoom lens barrel and is a development view of the cam frame having cams and a helicoid on the inner surface thereof.

As shown in FIG. 6, on an inner surface 50b of a cam frame 50, a female helicoid 51 and second-lens-group cam grooves 50c are formed.

The female helicoid 51 is engaged with a male helicoid formed on the outer surface of a first lens frame at the rear edge on the side of an image, resulting in forward movement of the first lens frame in the direction toward an object.

The second-lens-group cam grooves 50c are formed on the inner surface 50b in accordance with the number of second-lens-group pins on the outer surface of the second lens frame which is movably fitted into the first lens frame. Generally, the three second-lens-group cam grooves 50c are formed so as to be compatible with the second lens frame having three second-lens-group pins. The second-lens-group cam grooves 50c are engaged with the respective three second-lens-group pins, thereby moving the second lens frame in the direction toward the object in the first lens frame. In the diagram, reference symbol L1 in each second-lens-group cam groove 50c denotes a position of each second-lens-group pin for a second lens group when the present zoom lens barrel is collapsed; L2 a position of each second-lens-group pin when the present zoom lens barrel is located at a wide-angle end position (wide angle mode); and L3 a position of each second-lens-group pin when the present zoom lens barrel is located at a telephoto end position (telephoto mode).

As mentioned above, in the case of the cam frame having the cam grooves and the female helicoid on the inner surface, since the cam grooves are formed in an area where the female helicoid is formed, each cam groove has to be formed on the surface of the root of the female helicoid. In other words, the female helicoid and the cam groove are formed so as not to overlap each other longitudinally in the thickness direction, thereby preventing interference between the male helicoid which is engaged with the female helicoid and the cam groove.

For the depth of the cam groove, a certain depth is needed to realize smooth driving and prevent a cam follower from coming off. Therefore, in the case of the cam frame as shown in FIG. 6, the thickness of the cam frame tends to be high.

On the other hand, in order to respond to recent demands for a smaller size of camera, it is absolutely necessary to realize a reduction in size of a lens frame. In order to realize the miniaturization of the lens frame, it is necessary to reduce the thickness of the lens frame.

However, in the zoom lens barrel having the cam frame as shown in FIG. 6, when the thickness is reduced, either one of the depth of the second-lens-group cam groove 50c and the depth of the female helicoid 51, or both of them, have to be reduced. Accordingly, there is the following problem: the amount of engagement of the cam and that of the helicoid are reduced. For example, if an external force of any impact or blow is applied to the zoom lens barrel, the strength is not maintained.

As this kind of conventional zoom lens barrel, there is a zoom lens barrel proposed in, for example, Japanese Unexamined Patent Application Publication No. 10-293239 which intends to miniaturize a lens frame (cam frame).

In the zoom lens barrel according to the proposal, on the inner surface of a cam frame which is rotated, segments of a female helicoid which is engaged with a male helicoid formed on the outer surface of one lens support cylinder, and cam grooves in which follower pins protruded on another lens frame are fitted are formed so that at least one part of the female helicoid is overlapped with at least one part of the cam grooves in the axial direction. The zoom lens barrel is characterized in that areas in each of which the segment of the female helicoid is formed and areas in each of which the cam groove is formed are separately provided on the cam frame so that the cam grooves do not cross the female helicoid.

According to the proposal, the segments of the female helicoid and the cam grooves can be formed without shifting the positions of the segments of the female helicoid and the cam grooves longitudinally in the thickness of the cam frame. Thus, while the depth of the female helicoid and the depth of each cam groove are being maintained, the thickness of the cam frame can be reduced.

However, in the zoom lens barrel according to the proposal, since the segments of the female helicoid and the cam grooves are alternately formed in the circumferential direction on the inner surface of the cam frame, the whole area where the female helicoid is formed is small. Consequently, since the area where helicoid engagement is achieved in the circumferential direction is reduced, it is difficult to maintain enough strength. Further, the zoom lens barrel is generally required to have light shielding efficiency. The helicoid engagement can improve the light shielding efficiency. However, the light shielding efficiency accomplished by the helicoid engagement cannot be utilized because there are portions in each of which the helicoid engagement is not performed in the circumferential direction as mentioned above.

On the other hand, since driving loads on the zoom lens barrel are reduced to realize smooth driving, a reduction in lead angle is desired. Accordingly, a certain area is needed in the circumferential direction to such an extent that a desired amount of movement is ensured while the small lead angle is being maintained. However, since the female-helicoid forming areas and the cam-groove forming areas are separately formed in the circumferential direction on the inner surface of the cam frame, both of each female-helicoid forming area and each cam-groove forming area are small. Thus, it is difficult to miniaturize the zoom lens barrel while the driving loads on the zoom lens barrel are being reduced.

As mentioned above, in the conventional zoom lens barrel shown in FIG. 6, when the thickness of the cam frame is reduced in order to reduce the size of the cam frame, either one of the depth of the second-lens-group cam groove 50c and the depth of the female helicoid 51, or both of them, have to be reduced. Consequently, the amount of engagement of the cam and that of the helicoids are deteriorated. There is the following problem: for instance, if an external force of any impact or blow is applied to the zoom lens barrel, the strength is not maintained.

In the conventional zoom lens barrel disclosed in Japanese Unexamined Patent Application Publication No. 10-293239, since the segments of the female helicoid and the cam grooves are alternately formed in the circumferential direction on the inner surface of the cam frame, the area of the helicoid engagement in the circumferential direction is reduced. Thus, there is such a problem that it is difficult to obtain enough strength. There is also such a problem that the light shielding efficiency may be degraded in the portions where the helicoid engagement is not performed.

SUMMARY OF THE INVENTION

It is an object of the present invention to provide a camera in which when an external force of any impact or blow is applied to the zoom lens barrel, strong coupling of lens frames can be maintained and a small size of each lens frame can be realized.

Briefly, according to the present invention, the camera comprises: a first frame member having on an inner surface thereof a female helicoid and cam grooves each having substantially a same lead angle as a lead angle of the female helicoid, said cam groove being deeper than the female helicoid; and a second frame member which is placed inside the first frame member and which includes a male helicoid engaged with the female helicoid, and a cam follower engaged with the cam groove, wherein the first frame member is rotatable relative to the second frame member, so as to cause one of a forward and backward movement of the second frame member.

The features, objects and advantages of the present invention will become further apparent from the following detailed explanation.

DETAILED DESCRIPTION OF THE PREFERRED EMBODIMENTS

One embodiment of the present invention will now be described hereinbelow with reference to the drawings.

Figure 7:
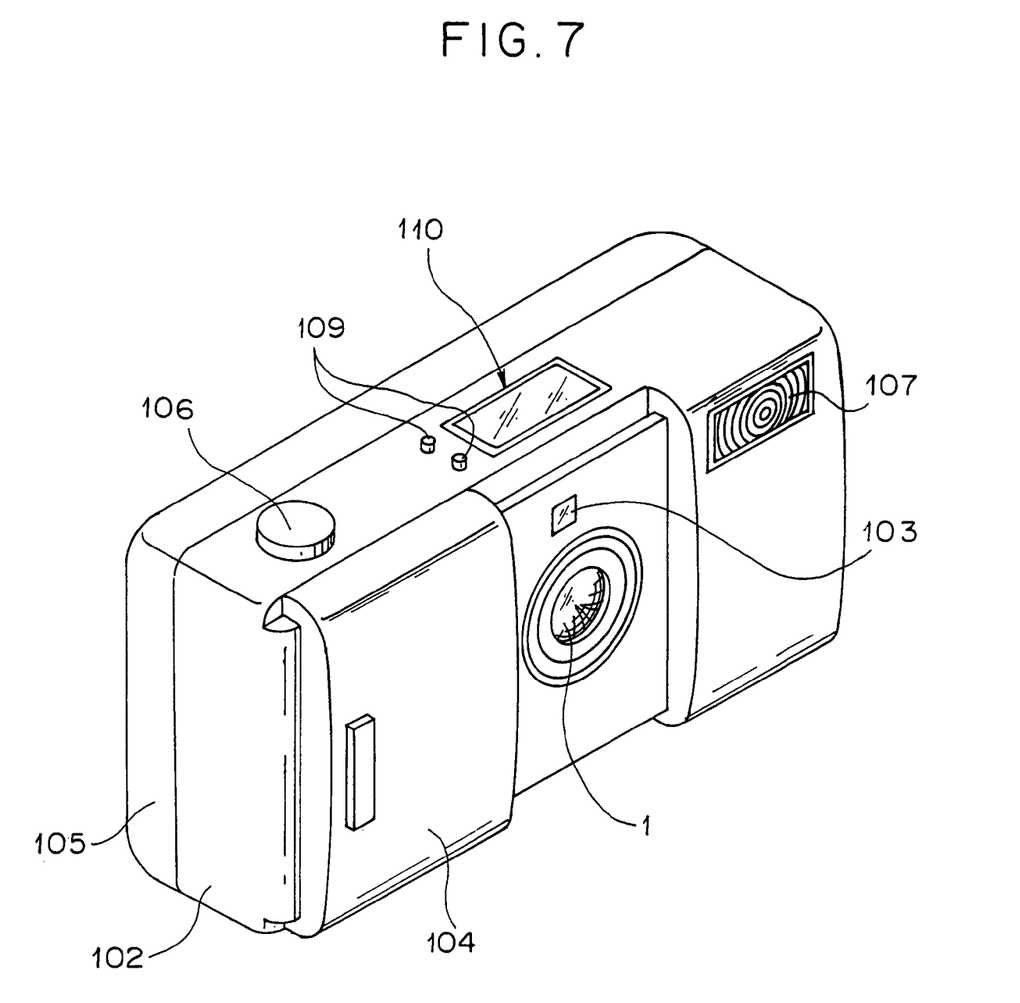
FIG. 7 is a perspective assembly view of the camera according to an embodiment of the present invention.

FIG. 7 is a perspective assembly view of the camera according to an embodiment of the present invention.

According to the embodiment of the present invention, a finder window 103 and a strobe scope window 107 are provided at a front surface of a front cover 102 of a camera 101. At the center of the camera 101, a zoom lens barrel 1 is provided. Furthermore, a lens barrier 104 is provided for slidably opening and closing the zoom lens barrel 1 and the finder window 103. On an upper surface of the camera 101, a display window 110, a mode-switching button 109, and a release switch 106 are provided. A camera body including a plurality of camera components (not shown) is enclosed between the front cover 102 and a rear cover 105.

FIGS. 1 to 5B show the zoom lens barrel of the camera according to an embodiment of the present invention.

Figure 1:
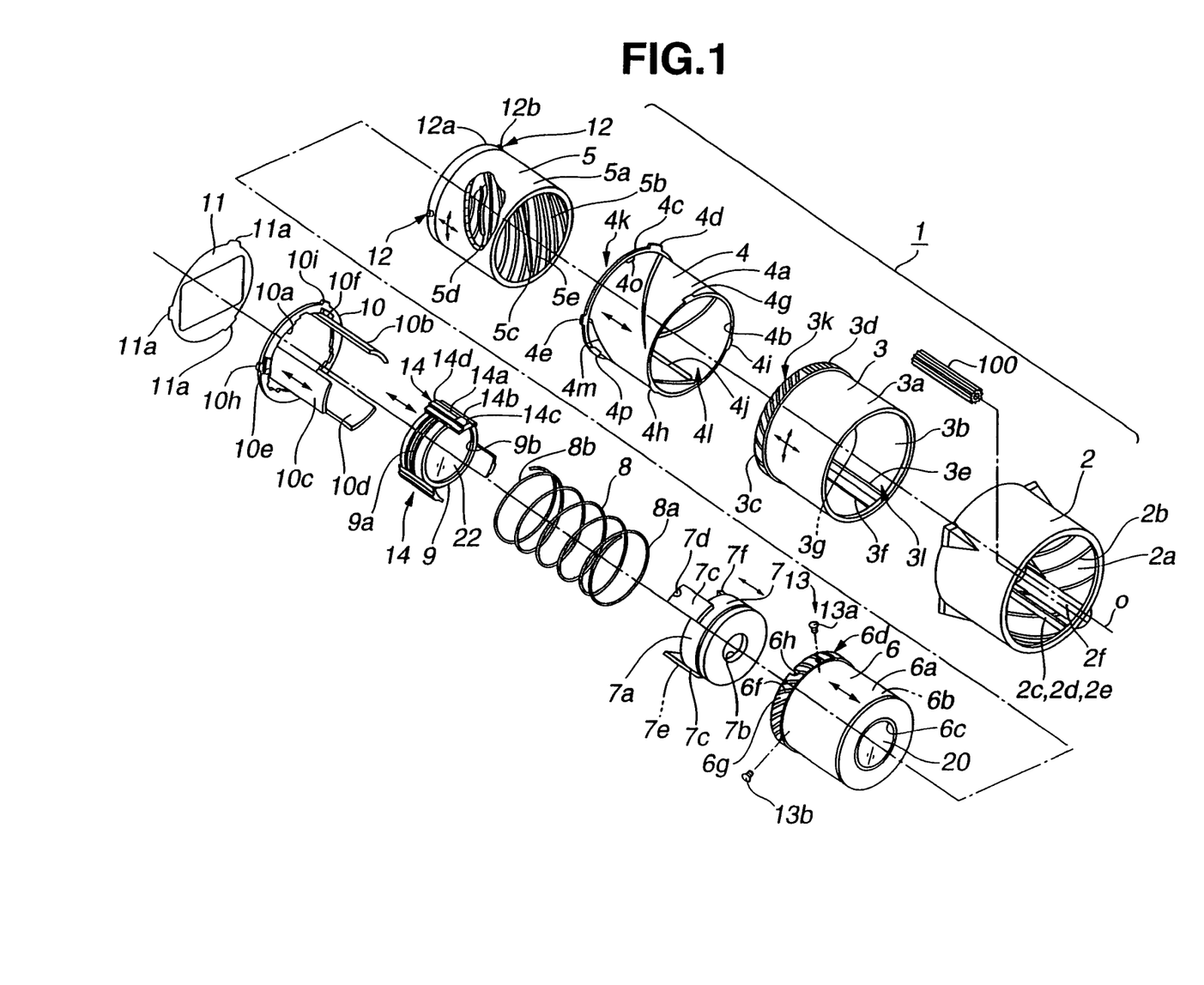
FIG. 1 is a perspective assembly view of a zoom lens barrel of a camera according to one embodiment of the present invention.

In the following description, it is assumed that an object side of the zoom lens barrel is set to a front side and an image side is set to a rear side. It is assumed that an optical axis of the zoom lens comprising a first lens group, a second lens group, and a third lens group is set to an optical axis O. The direction parallel to the optical axis O is set to a direction S0. A rotational direction around the optical axis O is designated by a rotational direction observed from the object side. In FIG. 1, arrows designate the above directions corresponding to the movements of components.

According to the illustrated embodiment of the present invention, as shown in FIGS. 1, 2A, 2B, and 2C, a zoom lens barrel 1 comprises: a stationary frame 2 which is fixed to a camera body and is supported thereby; a rotary frame 3 which fits into the stationary frame 2, then rotates, and moves forward or backward; a movable frame 4 which fits into the rotary frame 3 rotatably relative thereto, and then moves straight forward or backward together with the rotary frame 3 in the direction SO along the optical axis O; a cam frame 5 which fits into the movable frame 4, then rotates, and moves forward or backward; a first lens frame 6 which fits into the cam frame 5 and then moves straight forward or backward in the direction SO; a second lens frame 7 which fits into the first lens frame 6 and then moves straight forward or backward; a third lens frame 9 which fits into the first lens frame 6 and then moves straight forward or backward in the direction SO; a spring 8 which is placed between the second lens frame 7 and the third lens frame 9 and serves as pushing means for pushing the third lens frame 9 away from a first lens group; a float key 10 which is held at the rear of the cam frame 5 and moves straight forward or backward together with the cam frame 5 in the direction SO; a flare diaphragm 11 held at the rear of the movable frame 4; and a driving gear 100 which is placed inside the stationary frame 2 and transmits a driving force supplied from a zoom unit (not shown) to the rotary frame 3.

Serving as a photographic zoom lens optical system, the zoom lens barrel 1 further has a first lens group 20 held by the first lens frame 6, a second lens group 21 held by the second lens frame 7, and a third lens group 22 held by the third lens frame 9.

The stationary frame 2 is an annular member whose front (object-side) and rear (image-side) ends are opened. On an inner surface 2a thereof, female helicoid threads 2b, three straight recessed grooves 2c, 2d, and 2e (only 2c is shown) which are arranged at different positions in the circumferential direction and extend along the optical axis O, and a recessed gear room 2f extending along the optical axis O are formed.

The rotary frame 3 is an annular member whose front and rear ends are opened. At the rear (image-side) end of an outer surface 3a thereof, male helical threads 3c are formed in a predetermined width in the direction of the optical axis O and a gear portion 3d is formed in a predetermined area on the periphery where the male helicoid threads 3c are arranged. In this instance, the rear (image-side) opening of the rotary frame 3 is set to an opening 3k and the front (object-side) opening is set to an opening 3l.

Figure 2A:
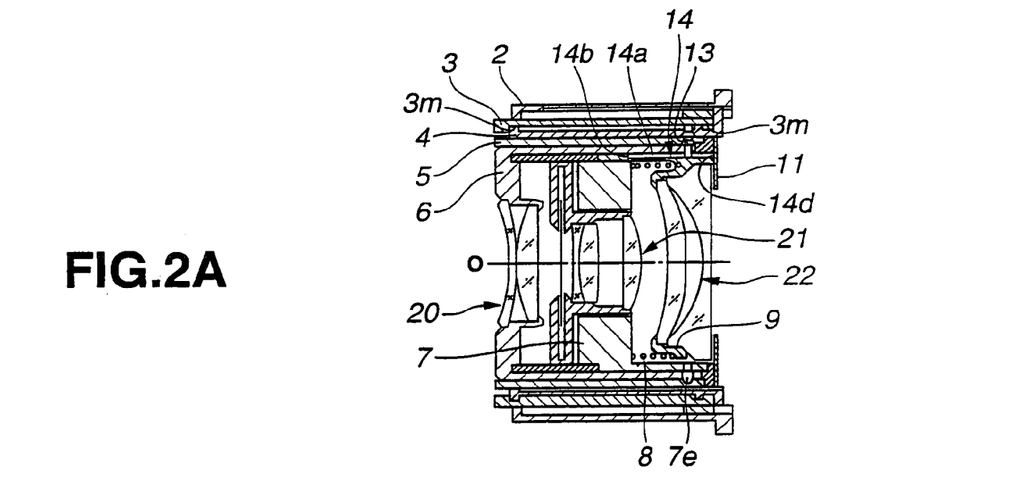
FIG. 2A is a sectional view of the configuration of the zoom lens barrel of the camera according to the present embodiment in a collapsing mode.
Figure 2B:
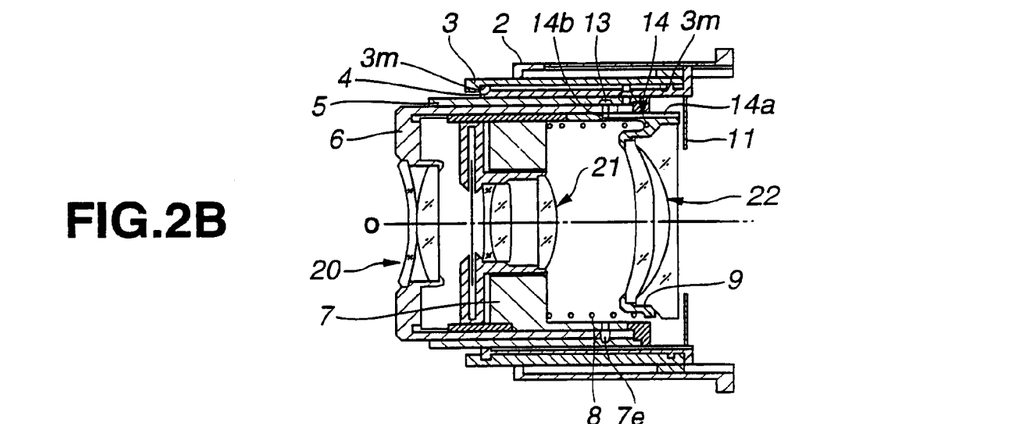
FIG. 2B is a sectional view of the configuration of the zoom lens barrel of the camera according to the present embodiment in a wide angle mode.
Figure 2C:
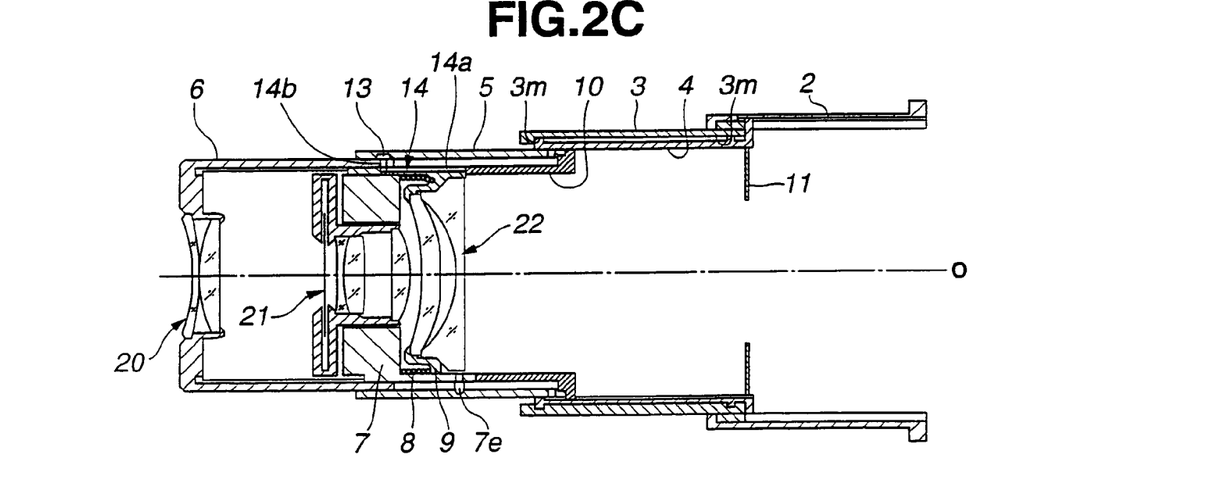
FIG. 2C is a sectional view of the configuration of the zoom lens barrel of the camera according to the present embodiment in a telephoto mode.

On an inner surface 3b of the rotary frame 3, thrust passage grooves 3e each serving as a straight groove having an introduction opening formed at the rear opening 3k, straight grooves 3f for straight guiding the movable frame 4, and movable-frame thrust-receiving circumferential grooves 3m shown in FIGS. 2A, 2B, and 2C, the grooves 3m serving as circumferential grooves communicating with the thrust passage grooves 3e and being formed at the edges of the inner surface, are provided.

The three thrust passage grooves 3e and the three straight grooves 3f are formed at different positions in the circumferential direction on the inner surface of the rotary frame 3.

In an assembly state of the present zoom lens barrel, the male helicoid threads 3c of the rotary frame 3 are engaged with the female helicoid threads 2b of the stationary frame 2. The rotary frame 3 moves forward and backward with respect to the stationary frame 2 along the optical axis O while being rotating. The driving gear 100 formed by a spur gear, which is long in the axial direction, is rotatably inserted into the gear room 2f of the stationary frame 2 in parallel to the optical axis O. The driving gear 100 is always engaged with the gear portion 3d of the rotary frame 3 to transmit a rotating force to the rotary frame 3.

The movable frame 4 is an annular member whose front and rear ends are opened. The rear (image-side) opening is set to an opening 4k and the front (object-side) opening is set to an opening 4l. A flange 4c is formed around the rear opening 4k on an outer surface 4a of the movable frame 4. On the flange 4c, protruded straight guides 4d, 4e, and 4f (not shown) are formed in the radial direction.

Further, on the outer surface 4a of the movable frame 4, three straight guiding protrusions 4o, 4p, and 4q (not shown) extending outward in the radial direction are formed at positions slightly away from the flange 4c on the side of the rear opening 4k. On the side of the front opening 4l, three auxiliary straight guiding protrusions 4g, 4h, and 4i extending outward in the radial direction are formed at front positions corresponding to the straight guiding protrusions 4o, 4p, and 4q in the axial direction.

On an inner surface 4b of the movable frame 4, three straight bottomed grooves 4j extending along the optical axis O, and three spiral perforating cam grooves 4m are formed. The width of each cam groove 4m gradually becomes narrower from the inner surface 4b to the outer surface 4a. The section of the groove is V-shaped. That is, each groove has slopes facing each other. Each of the cam grooves 4m communicates with a cam follower introduction opening (not shown) formed on the flange 4c. The flare diaphragm 11 made of a thin plate having an opening is fixed to the rear end of the movable frame 4 by well-known bayonet mounting.

In the assembly state of the present zoom lens barrel, the straight guides 4d, 4e, and 4f of the movable frame 4 are slidably fitted into the straight grooves 2c, 2d, and 2e of the stationary frame 2. Further, the three straight guiding protrusions 4o, 4p, and 4q and the auxiliary straight guiding protrusions 4g, 4h, and 4i of the movable frame 4 are inserted into the respective thrust passage grooves 3e of the rotary frame 3 and are then introduced to be rotatably and slidably fitted into the movable-frame thrust-receiving circumferential grooves 3m of the rotary frame 3 with no clearance in the axial direction. Consequently, the movable frame 4 does not rotate with respect to the stationary frame 2 and moves straight in the direction SO together with the rotary frame 3 which rotates and moves.

The straight guiding protrusions 4o, 4p, and 4q and the auxiliary straight guiding protrusions 4g, 4h, and 4i, which face with each other in the axial direction of the movable frame 4, are fitted into the respective movable-frame thrust-receiving circumferential grooves of the rotary frame 3. Accordingly, when an external force in the direction of the optical axis O affects the undermentioned cam frame 5 which fits into the movable frame 4 so as to be movable forward or backward, or the first lens frame 6 which fits into the cam frame 5 so as to be movable forward or backward, the external force is received by double engagement of between the rotary frame 3 and the straight guiding protrusions 4o, 4p, and 4q and the auxiliary straight guiding protrusions 4g, 4h, and 4i of the movable frame 4. Thus, an increase in strength against the external force is accomplished without breaking the straight guiding protrusions 4o, 4p, and 4q and the auxiliary straight guiding protrusions 4g, 4h, and 4i.

In the present zoom lens barrel, the cam frame 5, which the undermentioned first and second lens frames 6 and 7 are fitted into, undergoes improvements.

The cam frame 5 is an annular cam frame member whose front and rear ends are opened. Three cam followers 12 are fixed to the rear of an outer surface 5a of the cam frame 5. Each cam follower 12 is composed of two segments, namely, comprises a taper cam follower segment 12a on the bottom side and a small-diameter straight cam follower segment 12b on the top side.

An inner surface 5b of the cam frame 5 undergoes improvements serving as features of the present invention. In other words, as shown in the development view of the cam frame in FIG. 4, on the inner surface 5b of the cam frame 5, female helicoid threads 5e which are engaged with male helicoid threads 6f formed at a rear edge 6d of the first lens frame 6, three first-lens-group cam grooves 5c each of which has substantially the same lead angle θ as that of the female helicoid thread 5e and which is deeper than the female helicoid thread 5e, and three second-lens-group cam grooves 5d extending in the same direction as that of the first-lens-group cam grooves 5c without intersecting the cam grooves 5c are formed. A circumferential groove 5h for coupling with the float key 10 in the direction of the optical axis O is formed at the rear edge. The detailed configuration will be described later.

In the assembly state of the present zoom lens barrel, each cam follower 12 of the cam frame 5 is introduced through the introduction opening of each cam groove 4m of the movable frame 4. The straight cam follower segments 12b of the cam followers 12 are slidably fitted into the respective straight grooves 3f of the rotary frame 3 while being inserted in the cam grooves 4m of the movable frame 4. The taper cam follower segments 12a of the cam followers 12 are slidably fitted into the respective foregoing V-shaped cam grooves 4m of the movable frame 4. Therefore, the cam frame 5 is advanced or retracted in the direction of the optical axis O along the cam grooves 4m of the movable frame 4 while being rotated together with the rotary frame 3.

The first lens frame 6 is an annular member whose rear end is opened and which has a lens holding portion 6c for holding the first lens group 20 at the front end. On an inner surface 6b of the first lens frame 6, second-lens-frame straight guiding grooves (hereinbelow, referred to as second straight guiding grooves), third-lens-frame straight guiding grooves (hereinbelow, referred to as third straight guiding grooves), and float-key straight guiding grooves, each groove being not shown, are formed.

Further, according to the present embodiment, the male helicoid threads 6f, which are engaged with the female helicoid threads 5e of the cam frame 5, are formed at the rear edge 6d (the edge on the image side) on the outer surface of the first lens frame 6. Three pin mounting bases 6g each of which is screw-shaped protrusion having the same lead angle as that of the male helicoid thread 6f, whose width is larger than that of the male helicoid thread 6f, and in which the length of protrusion is smaller than that of the male helicoid thread 6f are formed in the circumferential direction. First-lens-group pins 13a, 13b, and 13c serving as cam followers are press-fitted and fixed to the pin mounting bases 6g. Three notches 6h, 6i, and 6j serving as clearances, which second-lens-group pins 7d, 7e, and 7f of the second lens frame 7 are fitted into when the present zoom lens barrel is collapsed, are formed at predetermined positions at the rear edge 6d of the first lens frame 6.

Figure 3:
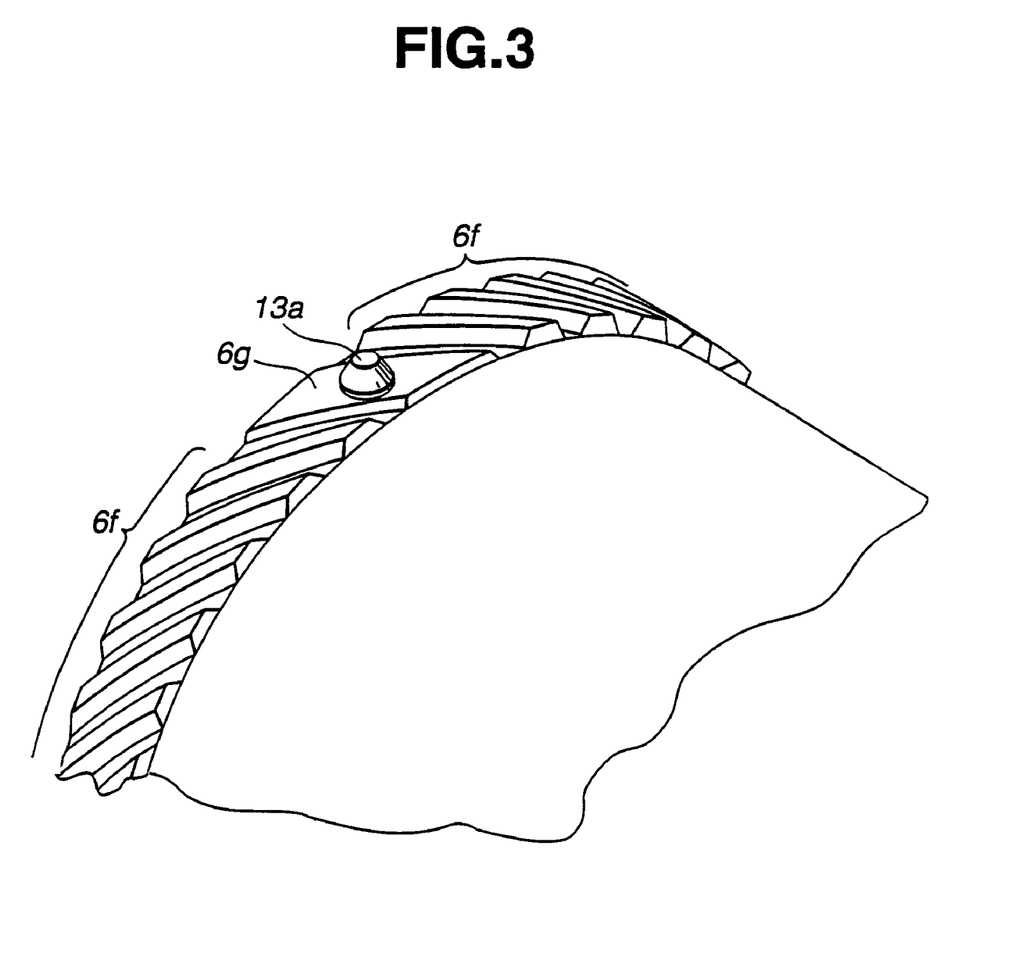
FIG. 3 is a perspective view of the configuration of a part including a first-lens-group pin of a first lens frame and a male helicoid in the zoom lens barrel of the camera according to the present embodiment.

When a portion of the rear edge 6d of the first lens frame 6 is enlarged, the portion is formed as shown in FIG. 3. That is, as shown in FIG. 3, the male helicoid threads 6f are formed at a predetermined height on the outer surface at the rear edge 6d of the first lens frame 6. The male helicoid threads 6f are engaged with the female helicoid threads 5e of the cam frame 5. When the first lens frame 6 is rotated relative to the cam frame 5, both of them are displaced relative to each other along the optical axis O. The respective first-lens-group pins 13a, 13b, and 13c (one of the three pins is shown in the diagram) are fixed to the tops of the respective pin mounting bases 6g at the predetermined positions so as to protrude higher than the ridge of the male helicoid thread 6f by a predetermined amount in the radial direction. In other words, the first-lens-group pins 13a, 13b, and 13c are formed higher than the male helicoid threads 6f so as to be engaged with the respective first-lens-group cam grooves 5c (refer to FIG. 4) each of which is deeper than the female helicoid thread 5e of the cam frame 5.

In the assembly state of the present lens barrel, the first lens frame 6 is fitted into the cam frame 5 so that the first-lens-group pins 13a, 13b, and 13c are engaged with the respective first-lens-group cam grooves 5c of the cam frame 5 and the male helicoid threads 6f at the rear edge 6d are engaged with the female helicoid threads 5e on the inner surface 5b of the cam frame 5. Simultaneously, straight guiding portions 10b, 10c, and 10d of a float key 10 are slidably fitted into the float-key guiding grooves (not shown) of the first lens frame 6. Thus, the first lens frame 6 advances or retracts straight along the optical axis O in association with the rotation of the cam frame 5 without being rotated because the float key 10 restrains the rotation of the first lens frame 6.

The second lens frame 7 is a substantially annular frame member having a center opening 7b. On three extensions of an outer surface 7a thereof, three second-lens-frame straight guiding portions (hereinbelow, referred to as second straight guiding portions) 7c are provided. The second-lens-group pins 7d, 7e, and 7f to be fitted into the respective second-lens-group cam grooves 5d of the came frame 5 are fixed to the respective second straight guiding portions 7c. The second lens group 21 is held in the center opening 7b. Further, a shutter unit and a focusing unit, which are not shown, are mounted inside the second lens frame 7.

In the assembly state of the present zoom lens barrel, the second lens frame 7 is slidably fitted into the first lens frame 6 along the optical axis O so that the three second straight guiding portions 7c on the outer surface 7a are engaged with the second straight guiding grooves of the first lens frame 6. The first lens frame 6, in which the second lens frame 7 is fitted, is fitted into the cam frame 5 so that the second-lens-group pins 7d, 7e, and 7f on the second straight guiding portions 7c are fitted into the second-lens-group cam grooves 5d of the cam frame 5. Therefore, the second lens frame 7 is guided in the direction S0 by the second straight guiding grooves of the first lens frame 6 and is then moved forward or backward along the optical axis O by the second-lens-group cam grooves 5d of the cam frame 5.

The third lens frame 9 is an annular frame member which has a center opening 9b and holds the third lens group 22 by the center opening 9b. On an outer surface 9a thereof, three extensions 14 extending along the optical axis are formed.

Each extension 14 includes a third-lens-frame straight guiding portion (hereinbelow, referred to as a third straight guiding portion) 14c which is formed on the surface of the extension 14 and is engaged with the third straight guiding groove on the inner surface of the first lens frame 6, and a first-lens-group pin sliding groove 14a which is formed in the third straight guiding portion 14c and is engaged with the first-lens-group pin 13 protruded on the inner surface of the first lens frame 6. Each of the first-lens-group sliding grooves 14a is formed in a predetermined length. The front end thereof on the front side toward an object (on the side of the first lens frame 6) serves as a positioning portion 14b for positioning the third lens frame 9 with respect to the first lens frame 6. On the other hand, the rear end of each extension 14 on the image side (on the side of the flare diaphragm) serves as a contact portion 14d which comes into contact with a predetermined portion of the flare diaphragm 11 in collapsing mode to restrict the movement of the third lens frame 9.

In the assembly state of the present zoom lens barrel, the third lens frame 9 is slidably fitted into the first lens frame 6 along the optical axis O so that the third straight guiding portions 14c of the three extensions 14 on the outer surface 9a of the third lens frame 9 are engaged with the third straight guiding grooves of the first lens frame 6, and simultaneously, the first-lens-group pins 13 protruded on the inner surface of the first lens frame 6 are engaged with the first-lens-group pin sliding grooves 14a of the respective three extensions 14. Thus, the third lens frame 9 is guided in the direction S0 by the third straight guiding grooves and the first-lens-group pins 13 of the first lens frame 6 and is then moved forward or backward relative to the first lens frame 6 along the optical axis O.

According to the present embodiment, in order to position the first lens frame 6 and the third lens frame 9 with high precision, the spring 8 serving as pushing means is inserted between the second lens frame 7 and the third lens frame 9.

The spring 8 is arranged so that one end 8a thereof on the object side is secured to the insides of the second straight guiding portions 7c of the second lens frame 7 and the other end 8b thereof on the image side is secured to the insides of the extensions 14 of the third lens frame 9. Thus, the third lens frame 9 is always pushed away from the first lens frame 6 along the optical axis O by the spring 8. In other words, from the collapsing mode to wide angle mode or telephoto mode, the first-lens-group pins 13 of the first lens frame 6 are restricted by the positioning portions 14b of the first-group sliding grooves 14a of the third lens frame 9 with the pushing force of the spring 8, so that the first lens frame 6 and the third lens frame 9 are held so as to have a predetermined space therebetween and zooming can be accomplished.

The float key 10 is an annular member having an opening 10a. Three protruded guiding portions 10h, 10i, and 10j extending in the radial direction are formed on the outer surface of the annular member. The three straight guiding portions 10b, 10c, and 10d, which are engaged with the float-key straight guiding grooves (not shown) formed on the inner surface of the first lens frame 6, are formed in the float key 10 along the optical axis. Bayonets 10e, 10f, and 10g to be bayonet-engaged with the circumferential grooves 5h of the cam frame 5 are formed at the rear portions of the respective straight guiding portions 10b, 10c, and 10d on the side of the annular member.

In the assembly state of the present zoom lens barrel, the straight guiding portions 10b, 10c, and 10d of the float key 10 are slidably fitted into the float-key straight guiding portions (not shown) of the first lens frame 6 along the optical axis O. The guiding portions 10h, 10i, and 10j of the float key 10 are engaged with the straight grooves 4j of the movable frame 4. The three bayonets 10e, 10f, and 10g are slidably engaged with the circumferential grooves 5h of the cam frame 5. Thus, the float key 10 is supported so as to be movable forward or backward in the direction S0 without being rotating and moves together with the cam frame 5 along the optical axis O and rotates relative to the cam frame 5.

The flare diaphragm 11 is disposed on the rear of the float key 10 on the image side. The flare diaphragm 11 is an annular member, made of a metal plate, having an opening. On the outer surface thereof, three bayonets 11a to fix the flare diaphragm 11 to the image-side rear end of the movable frame 4 by bayonet mounting are provided. The contact portions 14d of the extensions 14 of the third lens frame 9 come into contact with predetermined portions near the opening on the front surface of the flare diaphragm 11 in the collapsing mode (this state is not shown).

In other words, in the collapsing operation, the contact portions 14d come into contact with the front surface of the flare diaphragm 11 to restrain the movement of the third lens frame 9 toward an image. Thus, a space between the first lens frame 6 and the third lens frame 9 can be narrowed against the pushing force of the spring 8, resulting in positioning of the third lens frame 9 in the collapsing mode. As mentioned above, according to the present embodiment, the flare diaphragm 11 also functions as a thrust unit to thrust the third lens frame 9 against the spring 8 in the collapsing mode.

Figure 4:
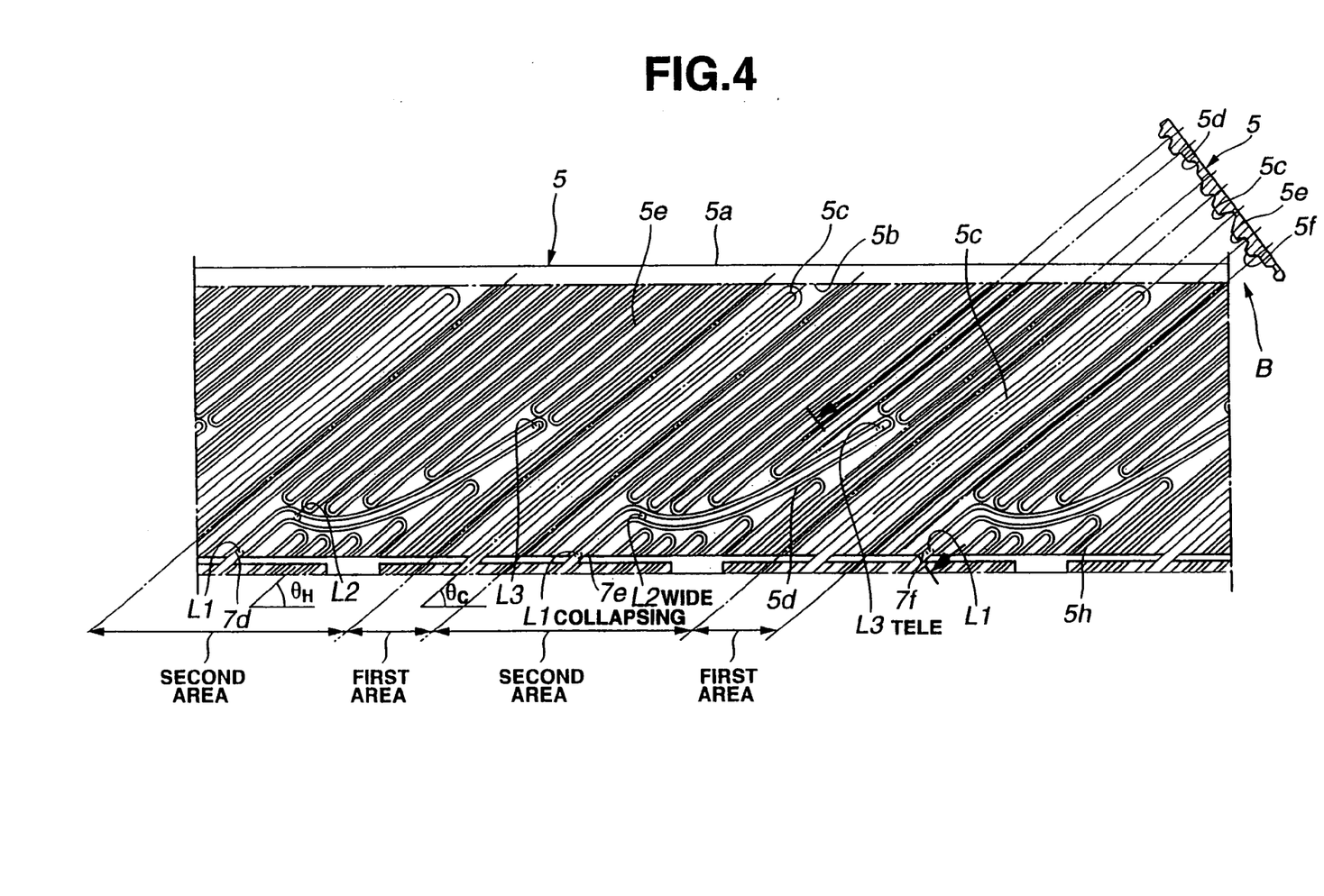
FIG. 4 is a development view of the inner surface of a cam frame in the zoom lens barrel of the camera according to the present embodiment.

The configuration of the inner surface of the cam frame serving as the features of the present embodiment will now be described in more detail with reference to FIG. 4.

As mentioned above, the female helicoid threads 5e, the first-lens-group cam grooves 5c, and the second-lens-group cam grooves 5d are arranged on the inner surface 5b of the cam frame 5. As shown in FIG. 4, the female helicoid threads 5e are formed in second areas other than first areas, where the first-lens-group cam grooves 5c are arranged, on the inner surface of the cam frame. The second areas correspond to areas other than the first areas on the whole inner surface of the cam frame 5. The first areas and the second areas are alternately arranged in the circumferential direction on the inner surface of the cam frame 5. In each of the second areas, each second-lens-group cam groove 5d is formed on the same surface as a root surface 5f serving as the surface of the root of the female helicoid threads 5e. In other words, each second-lens-group cam groove 5d and the female helicoid 5e are formed on the surfaces different from each other longitudinally in the thickness of the cam frame 5.

The second-lens-group cam grooves 5d are arranged in the three second areas, respectively. The second-lens-group pins 7d, 7e, and 7f of the second lens frame 7 are fitted into the respective second-lens-group cam grooves 5d. The lead angle of each second-lens-group cam groove is formed so as to be different from that of the female helicoid thread 5e. Reference symbols L1, L2, and L3 on each of the second-lens-group cam grooves 5d denote the positions of the second-lens-group pin, the positions corresponding to the modes in the zooming operation. L1 denotes a collapsing position, L2 denotes a wide angle position, and L3 denotes a telephoto position.

On the other hand, the three first-lens-group cam grooves 5c, which the respective three first-lens-group pins 13a, 13b, and 13c of the first lens frame 6 are fitted into, are arranged in the respective first areas so as to extend in the same direction as that of the female helicoid threads 5e without intersecting the threads 5e. In other words, the first-lens-group cam grooves 5c are arranged in the respective first areas each excluding the second-lens-group cam groove 5d and the female helicoid threads 5e.

Each of the first-lens-group cam grooves 5c is formed so that a lead angle θc of the first-lens-group cam groove 5c has substantially the same angle as a lead angle θH of the female helicoid thread 5e.

Further, according to the present embodiment, as mentioned above, the depth of each first-lens-group cam groove 5c is formed greater than the depth of the female helicoid thread 5e.

Figure 5A:
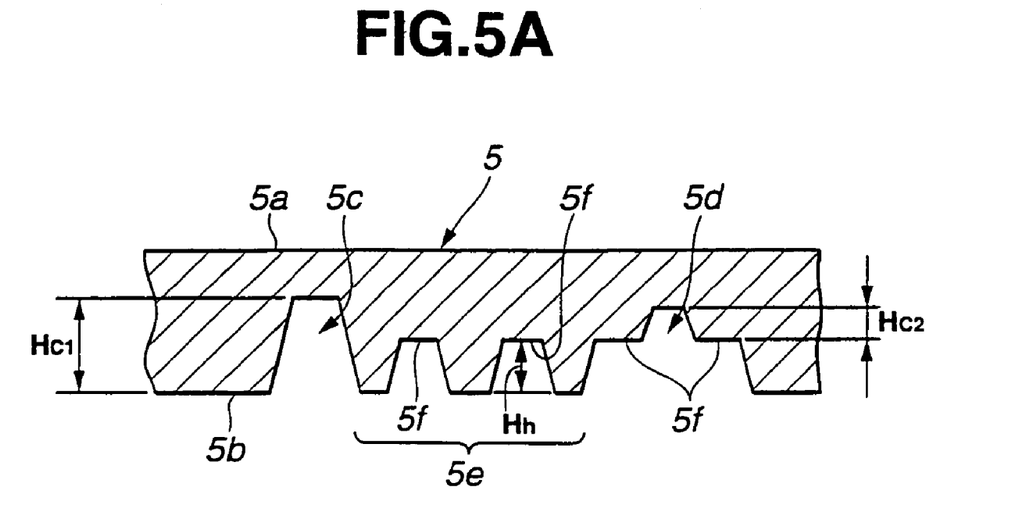
FIG. 5A is a sectional view explaining the configuration of each cam groove and the configuration of each female helicoid formed on the inner surface of the cam frame in the zoom lens barrel of the camera according to the present embodiment.

FIG. 5A shows the relationship between the depths of the first-lens-group cam groove 5c, the second-lens-group cam groove 5d, and the female helicoid threads 5e in the cam frame 5.

In other words, in the cam frame 5 according to the present embodiment, as shown in FIG. 5A, when it is assumed that the depth of each first-lens-group cam groove 5c is set to Hc1, the depth of the female helicoid thread 5e is set to Hh, and a difference between the depth of the second-lens-group cam groove 5d and that of the female helicoid thread 5e is set to Hc2, $Hc1 > Hh$.

According to the present embodiment, further, each first-lens-group cam groove 5c is formed so as to satisfy the following relation.

$Hc1 = Hh + Hc2$.

According to the present embodiment, a clearance formed in the engagement between each first-lens-group cam groove 5c and each of the first-lens-group pins 13a, 13b, and 13c is larger than that formed in the engagement between the male helicoid threads 6f and the female helicoid threads 5e.

Therefore, the operation of advancing the first lens frame 6 is performed through helicoid engagement between the female helicoid threads 5e and the male helicoid threads 6f using the cam frame 5 with the above configuration and the first lens frame 6. Thus, high strength is achieved. Furthermore, the second-lens-group pins 7d, 7e, and 7f of the second lens frame 7 are engaged with the respective second-lens-group cam grooves 5d to perform the operation of advancing the second lens frame 7, and the first-lens-group pins 13a, 13b, and 13c of the first lens frame 6 are surely engaged with the respective first-lens-group cam grooves 5c, each of which is deeper than the second-lens-group cam groove 5d and the female helicoid thread 5e, in order to perform the operation of advancing the first lens frame 6. Even if an external force such as any impact or blow is applied to the zoom lens barrel, strong coupling can be maintained.

Figure 5B:
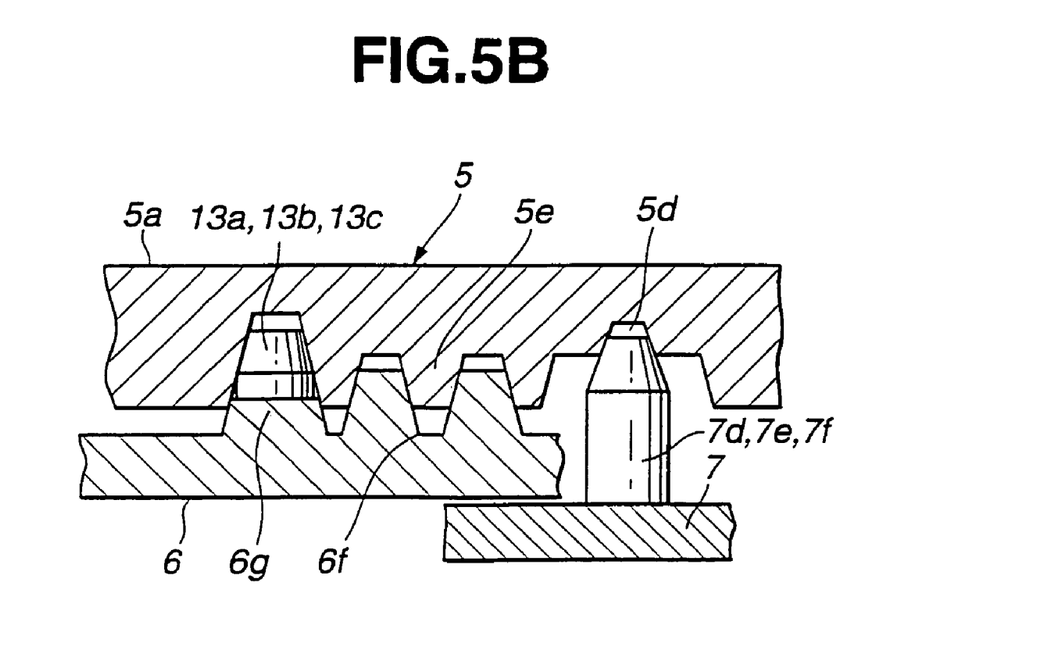
FIG. 5B is a sectional view explaining the configuration of each cam groove and the configuration of the female helicoid formed on the inner periphery in the zoom lens barrel of the camera according to the present embodiment.

Each of the pin mounting bases 6g is screw-shaped. Therefore, each pin mounting base 6g is engaged with the cam frame 5 in each second area of the cam frame 5 as shown in FIG. 5B. For the engagement between the cam frame 5 and the first lens frame 6, helicoid engagement is accomplished in the whole circumference. Thus, the light shielding efficiency accomplished by the helicoid engagement can be improved. Moreover, since the thickness of the cam frame can be reduced while the strong engagement is being maintained, the cam frame can be miniaturized. Thus, these advantages contribute much to reducing the size of the entire zoom lens barrel.

Next, the advancing and retracting operations of the zoom lens barrel having the above configuration according to the present embodiment in zooming will now be described.

When the present zoom lens barrel 1 is collapsed, as shown in the sectional view of FIG. 2A, all of the frame members are received in the stationary frame 2. At this time, the contact portions 14d of the extensions 14 of the third lens frame 9 are in contact with the corresponding portions on the front surface of the flare diaphragm 11 to restrict the position of the third lens frame 9, thereby positioning the zoom lens barrel with respect to a film plane. The second-lens-group pins 7d, 7e, and 7f of the second lens frame 7 are located at the collapsing positions L1 of the respective second-lens-group cam grooves 5d of the cam frame 5 as shown in FIG. 4, the pins being engaged with the grooves.

In order to advance the present zoom lens barrel 1 from the collapsing position to the wide angle position (wide-angle end position) where photographing can be performed as shown in the sectional view of FIG. 2B, the driving gear 100 is rotated clockwise by a predetermined amount through the zoom unit (driving mechanism) which is not shown. Thus, the rotary frame 3 is advanced while being rotated by the rotation of the driving gear 100. At that time, the movable frame 4, which is guided straight in the direction S0, moves forward straight relative to the rotary frame 3.

The cam frame 5 is rotated in a manner similar to the rotary frame 3 through the cam followers 12 and is then advanced farther than the rotary frame 3 through the cam grooves 4m of the movable frame 4.

Since the first lens frame 6 is guided straight in the direction S0 through the float key 10, the first-lens-group pins 13 are moved along the respective first-lens-group cam grooves 5c in association with the rotation of the cam frame 5 while the male helicoid threads 6f are being engaged with the female helicoid threads 5e. Thus, the first lens frame 6 is advanced to the wide-angle end position forwardly from the cam frame 5.

The second lens frame 7 is advanced to the wide-angle end position by the cam frame 5 while the second straight guiding portions 7c are being engaged with the respective second straight guiding grooves of the first lens frame 6 and are then being guided straight in the direction S0. In other words, the second-lens-group pins 7d, 7e, and 7f are moved along the respective second-lens-group cam grooves 5d of the cam frame 5 which rotates. Thus, the second lens frame 7 is advanced to the wide-angle end position. At this time, the second-lens-group pins 7d, 7e, and 7f of the second lens frame 7 are located at the wide angle positions L2 of the respective second-lens-group cam grooves 5d of the cam frame 5, the pins being engaged with the grooves.

According to the present embodiment, the third lens frame 9 is guided straight in the direction S0 while the third straight guiding portions 14c are being engaged with the respective third straight guiding grooves of the first lens frame 6. Simultaneously, the third lens frame 9 is always pushed away from the first lens frame 6 in the direction of the optical axis O by the spring 8. Accordingly, the third lens frame 9 is advanced to the wide-angle end position from the collapsing mode to the wide angle mode while a space between the third lens frame 9 and the first lens frame 6 is being widened. The first-lens-group pins 13 of the first lens frame 6 are restricted by the positioning portions 14b of the first-lens-group sliding grooves 14a in the extensions 14 due to the pushing force of the spring 8. After that, the first lens frame 6 and the third lens frame 9 are advanced together so as to have a predetermined space therebetween.

In order to advance the present zoom lens barrel 1 from the wide angle position to the telephoto position (telephoto end position) shown in the sectional view of FIG. 2C, the driving gear 100 is further rotated clockwise by a predetermined amount. Thus, the rotary frame 3 is advanced while being rotated by the rotation of the driving gear 100. Similarly, the movable frame 4 is guided straight. While being rotated, the cam frame 5 is advanced forward from the rotary frame 3 relative thereto.

The first lens frame 6 is further advanced to the telephoto end position forward from the cam frame 5 in association with the rotation of the cam frame. The second lens frame 7 is also advanced to the telephoto end position by the second-lens-group cam grooves 5d through the second-lens-group pins 7d, 7e, and 7f. At this time, as shown in FIG. 4, the second-lens-group pins 7d, 7e, and 7f of the second lens frame 7 are located at the telephoto end positions L3 of the respective second-lens-group cam grooves 5d of the cam frame 5, the pins being engaged with the grooves.

According to the present embodiment, the third lens frame 9 is advanced together with the first lens frame 6 from the wide-angle end position to the telephoto end position so as to have a space therebetween, the space being held by restricting the first-lens-group pins 13 through the positioning portions 14b of the first-lens-group sliding grooves 14a at the wide angle positions. That is, the space between the first lens frame 6 and the third lens frame 9 is not changed until zooming is performed at the telephoto end position.

On the other hand, in order to retract the present zoom lens barrel 1 to the collapsing mode, the driving gear 100 is rotated counterclockwise through the zoom unit (driving mechanism) which is not shown. Due to the rotation of the driving gear 100, the rotary frame 3, the movable frame 4, and the cam frame 5 are retracted relative to each other. Further, the first lens frame 6 and the second lens frame 7 are also retracted to the collapsing position relative to each other in association with the counter rotation of the cam frame 5. At this time, in a reverse manner of the zooming operation, the first lens frame 6 and the third lens frame 9 are retracted together with a predetermined space therebetween from the telephoto end position to the wide-angle end position. The space therebetween is narrowed from the wide angle position to the collapsing position. When the space is set to a predetermined space, the frames are retracted at the collapsing position.

In the zoom lens barrel 1 according to the present embodiment, for example, it is assumed that an external force of any impact or blow is applied to the zoom lens barrel 1 during the above-mentioned zooming operation. According to the present embodiment, however, since coupling is accomplished by the helicoid engagement between the female helicoid threads 5e and the male helicoid threads 6f, high strength is obtained. Furthermore, since the first-lens-group pins 13a, 13b, and 13c of the first lens frame 6 are engaged with the respective first-lens-group cam grooves 5c each of which is deeper than each second-lens-group cam groove 5d and the female helicoid thread 5e, stronger coupling is realized. Therefore, the first lens frame 6 is hardly detached from the cam frame 5 and the zooming operation can be smoothly executed.

In the case where the external force is applied to the zoom lens barrel, if the cam frame 5 or the first lens frame 6 is deformed to such an extent that the male helicoid threads 6f may be excessively pressed so as to come into contact with helicoid protruded portions of the female helicoid threads 5e, the strong engagement between the first-lens-group pins 13a, 13b, and 13c and the respective first-lens-group cam grooves 5c prevents the male helicoid threads 6f from being excessively pressed.

Therefore, according to the present embodiment, since the second-lens-group cam grooves 5d, the female helicoid threads 5e, and the first-lens-group cam grooves 5c are formed on the inner surface 5b of the cam frame 5, each first-lens-group cam groove being deeper than the female helicoid thread 5e and having substantially the same lead angle as that of the female helicoid thread 5e. Even if an external force of any impact or blow is applied to the zoom lens barrel, strong coupling between the lens frames can be maintained. Thus, the smooth zooming operation can be performed.

Since the width of each first area having the first-lens-group cam groove 5c, which the female helicoid threads 5e do not interfere with, is narrower than that of each second area having the second-lens-group cam groove 5d and the female helicoid threads 5e, the light shielding efficiency accomplished by the helicoid engagement is obtained. Thus, the photographic performance can be improved.

Further, since the thickness of the cam frame can be reduced while the strong engagement is being maintained, the cam frame can be miniaturized. Consequently, these advantages contribute much to a reduction in size of the entire zoom lens barrel.

According to the present embodiment, it is sufficient to form the cam frame 5 so that the depth of each first-lens-group cam groove 5c is greater than the groove depth of the female helicoid threads 5e. The respective depths can be set in consideration of the amount of engagement between the female helicoid threads 5e and the male helicoid threads 6f, the amount of engagement between the first-lens-group cam grooves 5c and the first-lens-group pins 13a, 13b, and 13c of the first lens frame 6, and the amount of engagement between the second-lens-group cam grooves 5d and the second-lens-group pins 7d, 7e, and 7f of the second lens frame 7.

Further, the present invention is not limited to the above described embodiment but modifications and variations of the embodiment may be made in accordance with the spirit and scope of the present invention as defined in the appended claims.

According to the present embodiment, each cam follower corresponding to each cam groove is formed independently of the corresponding frame. The invention is not limited to the case. Each cam follower can also be molded integrally with the corresponding frame. Similar advantages can be achieved.

As mentioned above, according to the present invention, there can be provided a zoom lens barrel in which even if an external force of any impact or blow is applied to the zoom lens barrel, strong coupling of lens frames can be maintained, and the lens frames can be miniaturized.

In this invention, it is apparent that working modes different in a wide range can be formed on this basis of this invention without departing from the spirit and scope of the invention. This invention is not restricted by any specific embodiment except as limited by the appended claims.

What is claimed is:

1. A camera comprising:
a first frame member having on an inner surface thereof a female helicoid and a cam groove having substantially a same lead angle as a lead angle of the female helicoid, said cam groove being deeper than the female helicoid; and
a second frame member which is placed inside the first frame member and which includes a male helicoid engaged with the female helicoid, and a cam follower engaged with the cam groove;
wherein the first frame member is rotatable relative to the second frame member, so as to cause one of forward and backward movement of the second frame member.

2. A camera according to claim 1, wherein:
a clearance formed by engagement between the cam groove and the cam follower is larger than each clearance formed by engagement between the male helicoid and the female helicoids;
the forward and backward movement of the second frame member due to rotation of the first frame member is produced by the engagement between the female helicoid and the male helicoids; and
when an external force is applied to the second frame member, the engagement between the cam follower and the cam groove prevents the second frame member from being detached from the first frame member.

3. A camera according to claim 1, wherein:
the cam follower is arranged on top of a thread of the male helicoid formed on the second frame member, said thread being wider and lower than other threads.

4. A camera comprising:
a first frame member having on an inner surface thereof at least a first area in which a cam groove is formed, and at least a second area in which a segment of a female helicoid is formed, said female helicoid having substantially a same lead angle as a lead angle of the cam groove and having a groove depth shallower than a groove depth of the cam groove; and
a second frame member having cam follower which is engaged with the cam groove and a male helicoid which is engaged with the female helicoids;
wherein the first frame member is rotatable relative to the second frame member, so as to cause one of forward and backward movement of the second frame member.

5. A camera according to claim 4, wherein:
a plurality of first areas and a plurality of second areas are alternately arranged in a circumferential direction of the first frame member, and each first area and each second area are formed in each of at least three places.

6. A camera according to claim 4, wherein:
a boundary between the first area and the second area is formed substantially parallel to a lead of the cam groove, and a width of the second area in a direction perpendicular to the lead of the cam groove is larger than a width of the first area.

7. A camera according to claim 4, wherein:
the cam follower is arranged on top of a thread of the male helicoid formed on the second frame member, said thread being wider and lower than other threads.

8. A camera according to claim 4, wherein:
a clearance formed by engagement between the cam groove and the cam follower is larger than each clearance formed by engagement between the male helicoid and the female helicoids;
the forward and backward movement of the second frame member due to rotation of the first frame member is produced by the engagement between the female helicoid and the male helicoids; and
when an external force is applied to the second frame member, the engagement between the cam follower and the cam groove prevents the second frame member from being detached from the first frame member.

9. A camera comprising:
a first frame member having on an inner surface thereof a female helicoid, first cam grooves each of which has substantially a same lead angle as a lead angle of the female helicoid and each of which is deeper than the female helicoid, and second cam grooves each of which has a lead angle different from the lead angle of the female helicoid and each of which is deeper than the female helicoid;
a second frame member having a male helicoid which is engaged with the female helicoid and first cam followers which are engaged with the first cam grooves; and
a third frame member having second cam followers which are engaged with the second cam grooves;
wherein the first frame member is rotatable relative to the second and third frame members, so as to cause the second and third frame members to be moved relative to the first frame member.

10. A camera according to claim 9, wherein:
each of the first cam grooves and each of the second cam grooves are formed in a circumferential direction of the first frame member in each of at least three places.

11. A camera according to claim 10, wherein:
a clearance formed by engagement between each first cam groove and each first cam follower is larger than each clearance formed by engagement between the male helicoid and the female helicoids;
forward and backward movement of the second frame member due to rotation of the first frame member is produced by the engagement between the female helicoid and the male helicoids; and
when an external force is applied to the second frame member, the engagement between the first cam followers and the first cam grooves prevents the second frame member from being detached from the first frame member.

12. A camera according to claim 10, wherein:
each of the first cam followers is arranged on top of a thread of the male helicoid formed on the second frame member, said thread being wider and lower than other threads.

13. A camera according to claim 9, wherein:
the first cam grooves and the second cam grooves have substantially a same depth.

14. A camera comprising:
a first frame member having on an inner surface thereof first areas, in each of which a first cam groove is formed, and second areas, in each of which a segment of a female helicoid and a second cam groove are formed, said female helicoid having substantially a same lead angle as a lead angle of the first cam groove, and said second cam groove having a lead angle different from the lead angle of the first cam groove;
a second frame member having cam followers which are engaged with the respective first cam grooves and a male helicoid which is engaged with the female helicoid; and
a third frame member having second cam followers which are engaged with the respective second cam grooves;
wherein each first cam groove is deeper than the female helicoid.

15. A camera according to claim 14, wherein:
a boundary between each first area and each second area is formed substantially parallel to a lead of each first cam groove, and a width of each second area in a direction perpendicular to the lead of each first cam groove is larger than a width of each first area.

16. A camera according to claim 14, wherein:
a clearance formed by engagement between each first cam groove and each first cam follower is larger than each clearance formed by engagement between the male helicoid and the female helicoids;
forward and backward movement of the second frame member due to rotation of the first frame member is produced by the engagement between the female helicoid and the male helicoids; and
when an external force is applied to the second frame member, the engagement between the first cam followers and the first cam grooves prevents the second frame member from being detached from the first frame member.

17. A camera according to claim 16, wherein:
a boundary between each first area and each second area is formed substantially parallel to a lead of each first cam groove, and a width of each second area in a direction perpendicular to the lead of each first cam groove is larger than a width of each first area.

18. A camera according to claim 14, wherein:
each of the second cam grooves is formed on a surface of a root of the female helicoid.

19. A camera according to claim 14, wherein:
the first areas and the second areas are alternately formed in a circumferential direction of the first frame member, and each first area and each second area are formed in each of at least three places.

20. A camera according to claim 14, wherein:
the first cam grooves and the second cam grooves have substantially a same depth.

21. A camera comprising:
a first frame wherein a first female helicoid is formed on the first region on the inner circumference face thereof, and a second female helicoid is formed with the same lead as the first female helicoid and a different groove depth from that of the first female helicoid on the second region in the inner circumference face thereof, and
a second frame disposed inside of the first frame, wherein a first male helicoid which spirally meshes with the first female helicoid, and a second male helicoid which spirally meshes with the second female helicoids, are formed on the outer circumference thereof;
wherein the second frame is relatively rotated with respect to the first frame so as to be linearly moved.

22. A camera according to claim 21, further comprising:
Cam grooves formed on the second region of the first frame; and
a third frame having cam followers for engaging the cam grooves;
wherein the first frame is relatively rotated with respect to the second frame and the third frame so that the second frame and the third frame are relatively moved with respect to the first frame along the optical axis direction.

23. A camera according to claim 22, wherein the cam groove is formed on substantially the same face as the bottom face of the second female helicoid in the thickness direction of the first frame, and the bottom face of the cam groove is substantially the same as the bottom face of the first female helicoid.

24. A camera according to claim 21, wherein a plurality of the first regions and the second regions are each provided.

25. A camera according to claim 24, wherein the first regions and the second regions are alternately disposed along the circumference direction of the first frame.

26. A camera according to claim 25, wherein three each of the first regions and the second regions are provided.

27. A camera according to claim 21, wherein the width of the first region is narrower than that of the second region in the circumference direction.

28. A camera according to claim 21, further comprising:
a straight guide member supported so as to be relatively immovable with respect to the first frame along the optical direction and be rotationally moved on the optical axis;
a first engaging tab provided to the straight guide member;
a guide portion provided to the first frame for guiding the first engaging tab so as to move relatively and rotationally on the optical axis with respect to the first frame;
a first tab inserting portion provided to one end portion of the first frame for inserting the first engaging tab into the guide portion; and
a helicoid inserting portion provided to one end portion of the first frame for the first male helicoid spirally to mesh with the first female helicoid;
wherein the first tab inserting portion is formed on the helicoid inserting portion.

29. A camera according to claim 28, further comprising:
a second engaging tab which is provided to the straight guide member, and is guided by the guide portion; and
a second tab inserting portion provided to one end portion of the first frame for inserting the second engaging tab into the guide portion;
wherein the second engaging tab is disposed at a position distanced by a predetermined distance with respect to the first engaging tab in the circumference direction, and in the event that one of the first engaging tab and the second engaging tab is positioned at a position corresponding to the helicoid inserting portion in the circumference direction, the other is positioned at a position other than the helicoid inserting portion.

30. A camera according to claim 29, wherein each of the first tab inserting portion, the second tab inserting portion, and the helicoid inserting portion, each consist of groove portions formed on one end portion of the first frame.

31. A camera according to claim 30, wherein the groove depths of the first tab inserting portion and the second tab inserting portion are greater than the groove depth of the helicoid inserting portion.

32. A camera according to claim 30, wherein the groove widths of the first tab inserting portion and the second tab inserting portion are narrower than the groove width of the helicoid inserting portion in the circumference direction.

33. A camera comprising:
a first frame wherein a first female helicoid is formed on the first region on the inner circumference face thereof, and a second female helicoid is formed with the same lead as the first female helicoid and a different groove depth from that of the first female helicoid on the second region; and
a second frame disposed inside of the first frame, wherein a first male helicoid which spirally meshes with the first female helicoid, and a second male helicoid which spirally meshes with the second female helicoids, are formed on the outer circumference thereof;
wherein the top portion of the thread of the second helicoid is formed on substantially the same face as the top portion of the thread of the first female helicoid in the thickness direction of the first frame, and the second female helicoid is formed with a thread depth less than that of the first female helicoid.

34. A camera according to claim 33, further comprising:
a cam groove formed on the second region of the first frame; and
a third frame having a cam follower for engaging the cam groove;
wherein the first frame is relatively rotated with respect to the second frame and the third frame so that each of the second frame and the third frame are relatively moved with respect to the first frame in the optical axis direction.

35. A camera according to claim 34, wherein the cam groove is formed on substantially the same face as the bottom face of the second female helicoid in the thickness direction of the first frame, and the bottom face of the cam groove is substantially the same face as the bottom face of the first female helicoid.

36. A camera according to claim 33, wherein a plurality of the first regions and the second regions are each provided.

37. A camera according to claim 36, wherein the first regions and the second regions are alternately disposed along the circumference direction of the first frame.

38. A camera according to claim 37, wherein three each of the first regions and the second regions are provided.

39. A camera according to claim 33, wherein the width of the first region is narrower than that of the second region in the circumference direction.

40. A camera according to claim 33, further comprising:
a straight guide member supported so as to be relatively immovable with respect to the first frame along the optical direction and be rotationally moved on the optical axis;
a first engaging tab provided to the straight guide member;
a guide portion provided to the first frame for guiding the first engaging tab so as to move relatively and rotationally on the optical axis with respect to the first frame;
a first tab inserting portion provided to one end portion of the first frame for inserting the first engaging tab into the guide portion; and
a helicoid inserting portion provided to one end portion of the first frame for the first male helicoid spirally meshing with the first female helicoid;
wherein the first tab inserting portion is formed on the helicoid inserting portion.

41. A camera according to claim 40, further comprising:
a second engaging tab which is provided to the straight guide member, and is guided by the guide member; and
a second tab inserting portion provided to one end portion of the first frame for inserting the second engaging tab into the guide portion;
wherein the second engaging tab is disposed at a position distanced by a predetermined distance with respect to the first engaging tab in the circumference direction, and in the event that one of the first engaging tab and the second engaging tab is positioned at a position corresponding to the helicoid inserting portion in the circumference direction, the other is positioned at a position other than the helicoid inserting portion.

42. A camera according to claim 41, wherein the first tab inserting portion, the second tab inserting portion, and the helicoid inserting portion, each consist of groove portions formed on one end portion of the first frame.

43. A camera according to claim 42, wherein the groove depths of the first tab inserting portion and the second tab inserting portion are greater than the groove depth of the helicoid inserting portion.

44. A camera according to claim 42, wherein the groove widths of the first tab inserting portion and the second tab inserting portion are narrower than the groove width of the helicoid inserting portion in the circumference direction.

* * * * *